United States Patent [19]

Bryce

[11] Patent Number: 4,764,725
[45] Date of Patent: Aug. 16, 1988

[54] APPARATUS FOR DETECTING COUNTERFEIT CURRENCY USING TWO COILS TO PRODUCE A SATURATING MAGNETIC FIELD

[75] Inventor: David R. Bryce, Morrisville, Pa.

[73] Assignee: Brandt, Inc., Bensalem, Pa.

[21] Appl. No.: 906,397

[22] Filed: Sep. 12, 1986

[51] Int. Cl.⁴ ............... G01N 27/72; G01R 33/12; G06K 7/06; B07C 5/342
[52] U.S. Cl. ........................ 324/234; 324/228; 235/449; 209/567
[58] Field of Search ............ 324/228, 234, 239–243; 235/449; 209/567, 569; 194/206

[56] References Cited

U.S. PATENT DOCUMENTS 3,223,988 12/1965 Danko .................... 324/234

Primary Examiner—Reinhard J. Eisenzopf
Assistant Examiner—Walter E. Snow
Attorney, Agent, or Firm—Shenier & O'Connor

[57] ABSTRACT

Counterfeit detection apparatus in which the coils of the magnetic head are utilized to produce a saturating current for the paper currency being examined which is sufficient to bring the magnetic ink printed upon the paper currency close to the saturation point to greatly facilitate the detection operation.

11 Claims, 2 Drawing Sheets

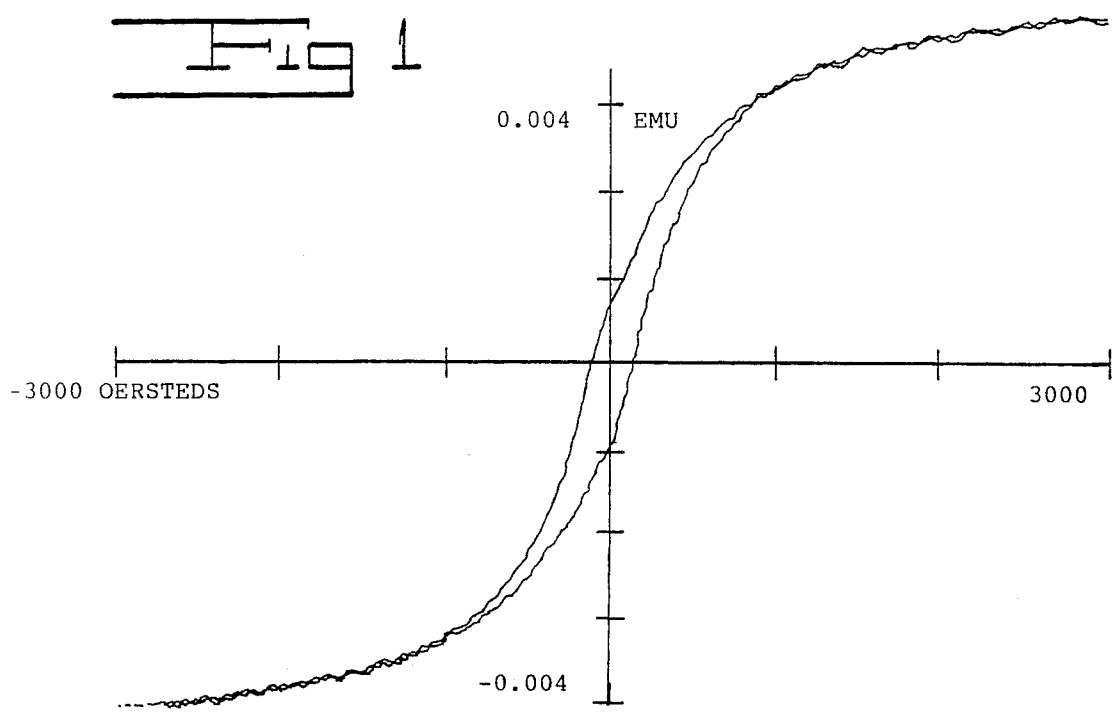
| | | | | |
|---|---|---|---|---|
| Magnetization | = 0.00391 EMU | Squareness Ratio | = | 0.195 |
| Retentivity | = 7.624E-4 EMU | SFD | = | 441.1 Oer. |
| Coercivity | = -113.8 Oersteds | Area in 1st Quad. | = | 0.433 |
| Timeconstant | = 3 Seconds | Area in 2nd Quad. | = | 0.0421 |
| Sweeptime | = 50 Minutes | Total Area | = | 0.9963 |
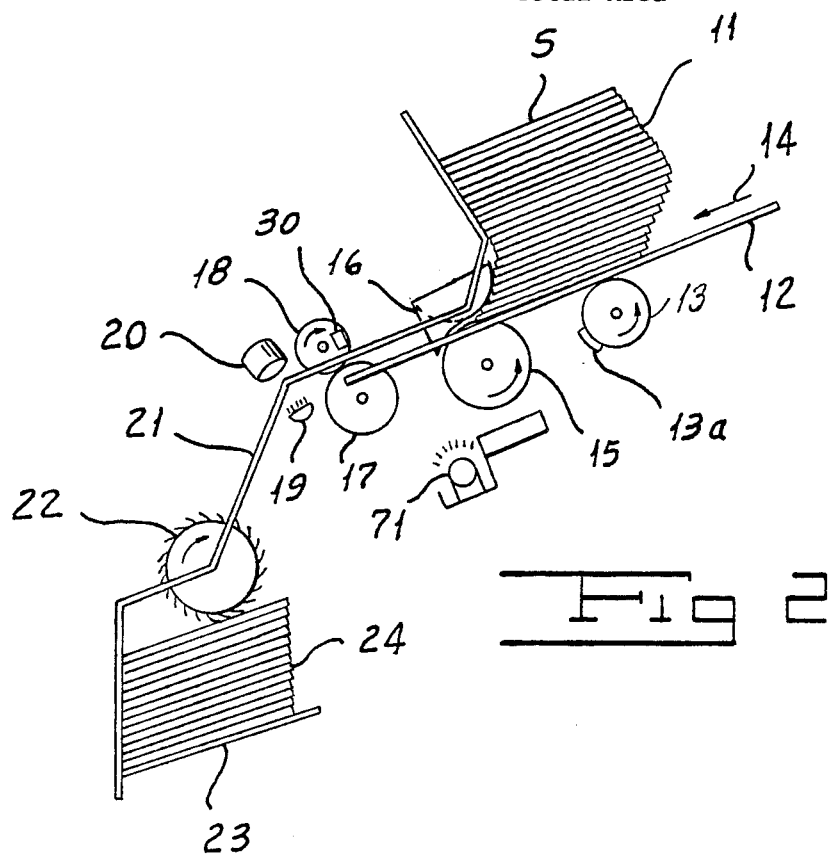

ern portion of the bill, the signals in each coil will be

APPARATUS FOR DETECTING COUNTERFEIT CURRENCY USING TWO COILS TO PRODUCE A SATURATING MAGNETIC FIELD

FIELD OF THE INVENTION

The present invention relates to magnetic detection circuits and more particularly to a novel magnetic detection circuit for use in examining paper currency for genuineness during a high speed handling and counting operation and in which magnetization and sensing are performed substantially simultaneously.

BACKGROUND OF THE INVENTION

Genuine U.S. currency has a magnetic property which is capable of being detected by a magnetic sensor. A hysteresis curve in which magnetization is plotted against magnetizing force of the black ink on a U.S. one dollar bill is shown in FIG. 1. The plot is in units of EMU and Oersteds. The plot of FIG. 1 shows that the retentivity of black ink on U.S. paper currency is significantly less than the saturation level, indicating that it is preferable to sense the saturation level rather than the retentivity level. This can be accomplished by magnetizing the bill at the sensing location.

Previous attempts to accomplish this suffer from the following problems:

1. The magnet tends to saturate the mu-metal shield surrounding the magnetic pick up head, thereby reducing the shielding effectiveness, and 2. The magnet tends to vibrate during machine operation causing an unacceptable magnetic noise source.

BRIEF DESCRIPTION OF THE INVENTION

In order to solve these problems, the present invention is characterized by comprising a magnetic head which is utilized as the magnetizing instrument thereby completely eliminating the need for a permanent magnet. A circuit of this design has been found to produce an output signal of twice the magnitude of the output signal obtained by the same circuit utilizing a permanent magnet to premagnetize the bill. In addition, the problems of reduced shielding effectiveness and unacceptable magnetic noise cannot arise.

OBJECTS OF THE INVENTION AND BRIEF DESCRIPTION OF THE FIGURES

It is therefore one object of the present invention to provide novel apparatus for determining the genuineness of paper currency through the utilization of a sensing circuit employing a magnetic head which serves to both magnetize and sense magnetizable material upon a paper bill.

The above as well as other objects of the present invention will become apparent when reading the accompanying description and drawing in which:

FIG. 1 shows an hysteresis curve of the black ink employed upon a U.S. one dollar bill.

FIG. 2 shows a simplified diagram of paper handling and counting apparatus employing the counterfeit detection apparatus of the present invention.

DETAILED DESCRIPTION OF THE INVENTION AND PREFERRED EMBODIMENTS THEREOF

Figure 3A:
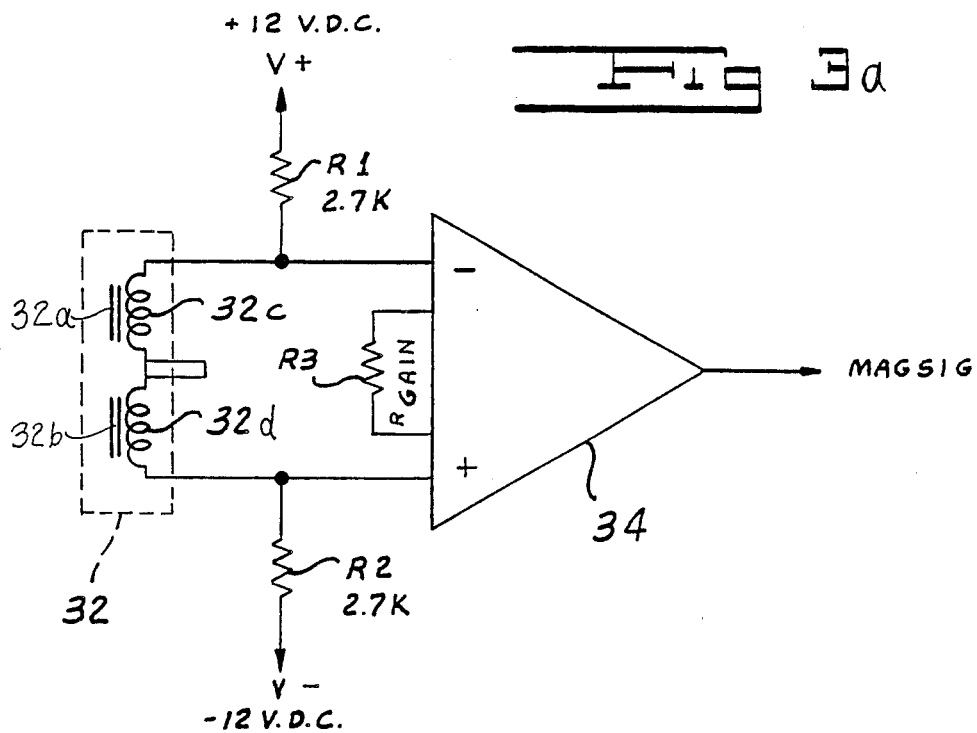
FIGS. 3a and 3b show schematic diagrams of a counterfeit detection circuit embodying the principles of the present invention.

FIG. 2 shows the principal elements of a document handling and counting device 10 comprising an input tray 11 for receiving a stack S of sheets thereon. The sheets are bottom fed by an eccentrically mounted surface 13a on picker roll 13 which periodically protrudes through a suitable opening provided in the floor 12 of feed tray 11. Sheets are fed in a direction shown by arrow 14 and enter between feed roller 15 and stripper 16 which form a feed nip assuring that only a single sheet will be fed beyond the feed nip toward an acceleration nip defined by acceleration roller 17 and idler 18. Sheets fed one-at-a-time into the acceleration nip are accelerated when their leading edges enter the acceleration nip. The acceleration action upon each sheet assures the formation of a sufficient gap between adjacent fed sheets to facilitate counting of the sheets, which counting is performed by cooperating light source 19 and sensing means 20 for generating a signal of a first level when sheets pass between elements 19 and 20 and for generating a second signal level when no sheet is present between elements 19 and 20. Although elements 19 and 20 are shown displaced from elements 17 and 18 for purposes of simplicity, it should be understood that elements 19 and 20 are preferably more closely aligned with the acceleration nip formed between acceleration rollers 17 and idler 18.

Sheets passing out of the acceleration nip are fed downstream and are guided by guide plate 21 into a stacker wheel 22 which thereafter delivers sheets delivered to the stacking wheel into an output stacker 23 which forms a stack 24 of the counted sheets.

The paper currency is examined for genuineness by a sensor 30 which is preferably in the region of the acceleration nip formed between rollers 17 and 18. The output signal of the counterfeit detection sensor 30 is utilized to abruptly halt the document handling and counting operation when a suspect bill is detected. Conversely, in the absence of a suspect signal, handling and counting continues in the normal fashion.

The sensing device 30 shown in FIG. 2 is shown in greater detail in FIG. 3a and is comprised of a dual magnetic pick up head 32 having magnetic cores 32a, 32b and individual magnetic coils 32c and 32d. Coils 32c and 32d are coupled together while the remaining coil terminals are coupled through resistors R1 and R2 to voltage sources V+ and V−.

The aforesaid terminals of coils 32c and 32d are further respectively coupled to the inverting and non-inverting inputs of an operational amplifier 34 whose gain is adjusted by resistance R3. A current is developed between the V+ source through each resistor R1 and R2 and series connected coils 32c, 32d to V−. This current creates a magnetic flux in each associated magnetic core whereby each core functions as an electromagnet.

As magnetic particles in the ink cross the "poles" of the aforesaid electromagnets, they become magnetized. As the magnetized particles move by each magnetic head, the flux strength, as seen by each core varies developing a $d\phi/dt$ condition which develops an alternating voltage across each magnetic head coil 32c, 32d.

Since each pole piece 32a, 32b scans a slightly differdifferent. This difference is amplified by amplifier 34 and produced at the output 34a as a signal MAGSIG.

Figure 3B:
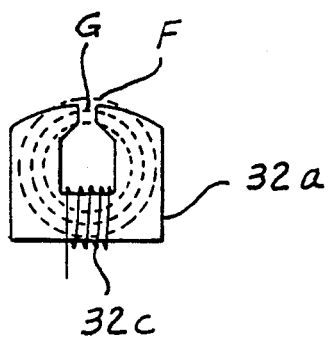

An alternative (but equivalent) way of understanding the production of MAGSIG will now be given. Consider the magnetic circuit consisting of the coil, such as coil 32c, the associated core 32a and the gap in the core, note FIG. 3b showing a simplified view of the coil 32c, core 32a and gap G. As current flows through coil 32c, flux lines F are established through the core and across gap G. The magnetic reluctance of the gap is quite high, but as the ink containing magnetic material passes the gap, the reluctance decreases. As the reluctance of the gap changes, the reluctance of the entire magnetic circuit changes, changing the number of flux lines that are established in core 32a and this $d\phi/dt$ produces the voltage across coil 32c.

Using this technique, it is preferred that the bills be arranged "face-up" so that the magnetizable black ink is immediately adjacent gap G. This technique yields only a slight disadvantage since it is preferred that the currency be run face-up for feeding and stripping operations; almost all operators typically have the currency "faced" prior to handling and counting; and a false "SUSPECT" stop on the rare unfaced bill is easily explained by the operator.

The suspect signal is combined with a count signal, for example, from sensor 20, typically by logical gating means, to generate a stop signal when the trailing edge of the suspect bill has passed the sensing means 20 shown in FIG. 2. The stop signal is utilized to halt feed roller 15 while permitting the acceleration roller 17 and the stacker wheel 22 to continue operating at least until the suspect bill has been delivered to output tray 23. The abrupt halting of feed roller 15 prevents the next bill following the suspect bill from reaching the output tray, thus facilitating inspection of the suspect bill by the operator.

The present invention, in one preferred embodiment utilizes a magnetic pick-up head model number 00194 manufactured by Michigan Magnetics, Inc. The operational amplifier is an instrumentation amplifier model number INA101AM manufactured by Burr-Brown Corporation.

In order to obtain an adequate magnetizing field a 24 volt ($\pm 12$ V) DC source was employed and resistors R1 and R2 were chosen to have values of 2.7K ohms. Given that the resistance of the magnetic head is of the order of 425 ohms, the magnetizing current is of the order of 3.84 milliamps. The use of a magnetic head having 1135 turns and a gap of 80 microinches, yielded a magnetizing field within the gap of each pole piece equal to $2.14 \times 10^6$ Oersteds. Fringing effects around each pole piece produce a magnetizing force at the document surface that exceeds 3000 Oersteds, which, as can be seen from FIG. 1, is in the saturation region of the black ink on U.S. currency.

A latitude of modification, change and substitution is intended in the foregoing disclosure, and in some instances, some features of the invention will be employed without a corresponding use of other features. Accordingly, it is appropriate that the appended claims can be construed broadly and in a manner consistent with the spirit and scope of the invention herein.

What is claimed:

1. Apparatus for detecting the presence of a genuine bill of paper currency containing magnetic material comprising:
    magnetic sensor means including first and second pole pieces each having a gap;
    first and second coils each respectively magnetically coupled to an associated one of said pole pieces;
    first ones of the terminals of said first and second coils being connected in common;
    second terminals of said first and second coils being connected at respective junction points to first and second resistance means to form a series connection, said resistance means having substantially equal resistance values;
    a DC voltage source coupled across the series connection of the first and second coils and the first and second resistance means; and
    operational amplifier means having inverting and non-inverting inputs and an output;
    the junction points between the said second terminals and resistance means being respectively coupled to said inverting and non-inverting inputs;
    the value of said DC voltage and said resistance values being selected to provide currents for said coils sufficient to drive the magnetic material on said paper currency close to the saturation point to enhance the sensing of suspect currency.

2. The apparatus of claim 1 wherein said current and the number of turns of said coil is sufficient to generate a magnetizing field which is sufficient to bring the magnetic material on the paper currency being examined to at least 75 percent of its saturation value.

3. The apparatus of claim 1 wherein the values said DC voltage source, said resistance and the turns of said coils are sufficient to provide a magnetizing force which brings the magnetic ink on the paper currency being examined to at least 75 percent of its saturation value.

4. The apparatus of claim 1 wherein said voltage value and said resistance value are chose to provide a current which is in the range from 3.0 to 4.5 milliamps.

5. The apparatus of claim 4 wherein said current range is preferably between 3.5 and 4.0 milliamps.

6. The apparatus of claim 5 wherein the number of turns in said coils is of the order of 1000 to 1200 turns.

7. The apparatus of claim 6 wherein the preferred turns lies within the range from 1100 to 1200 turns.

8. The apparatus of claim 6 wherein said pole pieces have a gap of the order of 60 to 100 inches.

9. The apparatus of claim 1 wherein the values of said DC voltage and said resistances are selected to provide a magnetizing field at the document surface of at least 2000 Oersteds.

10. The apparatus of claim 9 wherein magnetizing field is greater than 3000 Oersteds.

11. The apparatus of claim 1 wherein the values of said DC voltage and said resistances are selected to provide a magnetizing field at the document surface of between 2000 and 3500 Oersteds.

* * * * *